US 8,489,811 B1
Jul. 16, 2013

(12) United States Patent
Corbett et al.

(54) SYSTEM AND METHOD FOR ADDRESSING DATA CONTAINERS USING DATA SET IDENTIFIERS

(75) Inventors: Peter F. Corbett, Lexington, MA (US); Richard P. Jernigan, IV, Sewickley, PA (US); Vani Vully, Cranberry Township, PA (US); Balaji Ramani, Cranberry Township, PA (US); Srishylam Simharajan, Cranberry Township, PA (US); Michael Eisler, Colorado Springs, CO (US); Michael Kazar, Pittsburgh, PA (US)

(73) Assignee: NetApp, Inc., Sunnyvale, CA (US)

( * ) Notice: Subject to any disclaimer, the term of this patent is extended or adjusted under 35 U.S.C. 154(b) by 663 days.

(21) Appl. No.: 11/648,161

(22) Filed: Dec. 29, 2006

(51) Int. Cl.
  *G06F 12/00* (2006.01)
  *G06F 13/00* (2006.01)
  *G06F 13/28* (2006.01)
  *G06F 17/30* (2006.01)

(52) U.S. Cl.
  USPC .......................................... 711/114; 707/827

(58) Field of Classification Search
  None
  See application file for complete search history.

(56) References Cited

U.S. PATENT DOCUMENTS

| | | |
|---|---|---|
| 4,899,342 A | 2/1990 | Potter et al. |
| 4,916,608 A | 4/1990 | Shultz |
| 4,989,206 A | 1/1991 | Dunphy, Jr. et al. |
| 5,124,987 A | 6/1992 | Milligan et al. |
| 5,155,835 A | 10/1992 | Belsan |
| 5,163,131 A | 11/1992 | Row et al. |
| 5,202,979 A | 4/1993 | Hillis et al. |
| 5,355,453 A | 10/1994 | Row et al. |
| 5,485,579 A | 1/1996 | Hitz et al. |
| 5,581,724 A | 12/1996 | Belsan et al. |
| 5,701,516 A | 12/1997 | Cheng et al. |
| 5,802,366 A | 9/1998 | Row et al. |
| 5,819,292 A | 10/1998 | Hitz et al. |
| 5,897,661 A | 4/1999 | Baranovsky et al. |
| 5,931,918 A | 8/1999 | Row et al. |

(Continued)

FOREIGN PATENT DOCUMENTS

| | | |
|---|---|---|
| EP | 0 892 347 | 1/1999 |
| JP | 10003440 | 6/1998 |
| WO | WO 00/07101 | 2/2000 |
| WO | WO 2006/118957 | 11/2006 |

OTHER PUBLICATIONS

Bitton et al., Disk Shadowing, 1988, Procedings of the 14th VLDB Conference, 8 pages.*

(Continued)

*Primary Examiner* — Brian Peugh
*Assistant Examiner* — Gary W Cygiel
(74) *Attorney, Agent, or Firm* — Cesari and McKenna, LLP

(57) ABSTRACT

A system and method addresses data containers in a clustered storage system. Each instantiation of a volume, or other container set, is associated with a data set identifier (DSID). All instantiations of data that represent a single point in time are associated with a master data set identifier (MSID). A volume location database (VLDB), utilizing a replicated database among the nodes of the cluster, stores a data set data structure containing appropriate mapping information between the MSIDs and DSIDs. Clients of the clustered storage system utilize MSIDs to reference data that is desired to be accessed. When a storage system receives a data access request containing a MSID, the storage system accesses the VLDB to identify an appropriate DSID to which to forward the request. The data access request is then forwarded to the appropriate storage system for processing.

21 Claims, 14 Drawing Sheets

U.S. PATENT DOCUMENTS

| | | | |
|---|---|---|---|
| 5,941,972 | A | 8/1999 | Hoese et al. |
| 5,963,962 | A | 10/1999 | Hitz et al. |
| 5,987,477 | A | 11/1999 | Schmuck et al. |
| 6,032,216 | A | 2/2000 | Schmuck et al. |
| 6,038,570 | A | 3/2000 | Hitz et al. |
| 6,065,037 | A | 5/2000 | Hitz et al. |
| 6,173,293 | B1 | 1/2001 | Thekkath et al. |
| 6,275,898 | B1 | 8/2001 | DeKoning |
| 6,324,581 | B1 | 11/2001 | Xu et al. |
| 6,425,035 | B2 | 7/2002 | Hoese et al. |
| 6,502,166 | B1 | 12/2002 | Cassidy |
| 6,564,252 | B1 | 5/2003 | Hickman et al. |
| 6,606,690 | B2 | 8/2003 | Padovano |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,697,846 | B1 | 2/2004 | Soltis |
| 6,721,764 | B2 | 4/2004 | Hitz et al. |
| 6,868,417 | B2 | 3/2005 | Kazar et al. |
| 6,931,450 | B2 | 8/2005 | Howard et al. |
| 6,978,283 | B1 | 12/2005 | Edwards et al. |
| 7,010,528 | B2 | 3/2006 | Curran et al. |
| 7,038,058 | B2 | 5/2006 | Rust et al. |
| 7,159,093 | B2 | 1/2007 | Dalal et al. |
| 7,162,486 | B2 | 1/2007 | Patel et al. |
| 7,185,144 | B2 | 2/2007 | Corbett et al. |
| 7,194,597 | B2 | 3/2007 | Willis et al. |
| 7,231,412 | B2 | 6/2007 | Hitz et al. |
| 7,302,520 | B2 | 11/2007 | Kazar et al. |
| 7,366,837 | B2 | 4/2008 | Corbett et al. |
| 7,409,494 | B2 | 8/2008 | Edwards et al. |
| 7,409,497 | B1 | 8/2008 | Jernigan et al. |
| 7,412,496 | B2 | 8/2008 | Fridella et al. |
| 2002/0049883 | A1 | 4/2002 | Schneider et al. |
| 2003/0131182 | A1* | 7/2003 | Kumar et al. ............... 711/5 |
| 2003/0188045 | A1 | 10/2003 | Jacobson |
| 2004/0030668 | A1 | 2/2004 | Pawlowski et al. |
| 2004/0122917 | A1 | 6/2004 | Menon et al. |
| 2004/0133570 | A1 | 7/2004 | Soltis |
| 2004/0133607 | A1* | 7/2004 | Miloushev et al. ......... 707/200 |
| 2004/0139167 | A1 | 7/2004 | Edsall et al. |
| 2005/0097260 | A1 | 5/2005 | McGovern et al. |
| 2005/0278383 | A1* | 12/2005 | Kazar et al. ............... 707/200 |
| 2006/0184587 | A1 | 8/2006 | Federwisch et al. |
| 2006/0184731 | A1 | 8/2006 | Corbett et al. |
| 2007/0088702 | A1 | 4/2007 | Fridella et al. |

OTHER PUBLICATIONS

Administration Guide found at http://www.openafs.org/pages/doc/AdminGuide/auagd010.htm, visited on Mar. 2, 2005, 34 pages.

Auspex Systems, LFS—A Local File System for Multiprocessor NFS Network Servers, 1994, 6 pages.

Blasgen, M.W. et al., System R: An architectural Overview, Reprinted from IBM Systems Journal vol. 20, No. 1, 1981, Copyright 1981, 1999, 22 pages.

Borenstein, Nathaniel S., CMU's Andrew project a retrospective, Communications of ACM, 39(12), Dec. 1996, 33 pages.

Brinkmann, A. et al., Efficient Distributed Data Placement Strategies for Storage Area Networks, Proceedings of the Twelfth Annual ACM Symposium on Parallel Algorithms and Architectures, ACM, Jul. 2000, 10 pages.

Brown, Mark R. et al., The Alpine file system, ACM Transactions on Computing Systems, 3(4):261-293, Nov. 1985.

Carns, P. H., et al, "PVFS: A Parallel File System for Linux Clusters", Proceedings of the 4.sup.th Annual Linux Showcase and Conference, Atlanta, GA, Oct. 2000, pp. 317-327.

Celerra File Server Architecture for High Availability, EMC2 where information lives, Aug. 1999, 12 pages.

Chutani, Sailesh, et al., The Episode File System, In Proceedings of the USENIX Winter 1992, 18 pages.

Dibble, Peter C., et al., Beyond Striping: The Bridge Multiprocessor File System, Computer Science Department, University of Rochester, Aug. 11, 1989, 8 pages.

Douglis, Fred, et al., A comparison of two distributed systems: Amoeba and Sprite—Computing Systems, 4(4), Fall 1991, pp. 353-385.

Finlayson, Ross S., et al., Log Files: An Extended File Service Exploiting Write-Once Storage Department of Computer Science, Stanford University, Report No. STAN-CS-87/1177, Sep. 1987, 14 pages.

Gait, Jason, Phoenix: A Safe In-Memory File System. Communications of the ACM, 33(1): pp. 81-86, Jan. 1990.

Ganger, G. R. et al., "Disk Subsystem Load Balancing: Disk Striping vs. Conventional Data Placement", Proceedings of the 26th International Conference System Sciences, Wailea, Hawaii, IEEE, Jan. 5, 1993, 10 pages.

Gray, Jim, et al., The Recovery Manager of the System R Database Manager, ACM Computing Surveys, (13)2:223-242 1981, 20 pages.

Hartman, John H. et al., Performance Measurements of a Multiprocessor Sprite Kernel, Proceedings of the USENIX Conference, 1990, 13 pages.

Hartman, J. H., et al., "Zebra: A Striped Network File System" Proceedings of the Usenix File Systems Workshop, Apr. 1998 pp. 1-9, XP002926950.

Hartman, J. H., et al. "The Zebra Striped Network File System" Dec. 1, 1993, Operating Systems Review, ACM, New York, NY, US, pp. 29-43, XP000418681, Issn: 0163-5908.

Hitz, Dave et al., File System Design for an NFS File Server Appliance, Technical Report 3002, Rev. C395, presented Jan. 19, 1994, 23 pages.

Ho, T. K., et al. "A Row Permutated Data Reorganization Algorithm for Growing Server-Less Video-on-Demand Systems", Third IEEE International Symposium on Cluster Computing and the Grid (CCGrid'03), IEEE/ACM, May 12, 2003, 8 pages.

Honicky, R. J., et al. "A Fast Algorithm for Online Placement and Reorganization of Replicated Data", Proceedings of the International Parallel and Distributed Processing Symposium, (IPDPS), IEEE, Apr. 2003, 10 pages.

Howard, John H., An Overview of the Andrew File System, Carnegie Mellon University, CMU-ITC-88-062 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC88-063, 12 pages.

Ligon, W. B. III, et al., "Implementation and Performance of a Parallel File System for High Performance Distributed Application", Proceedings of the fifth IEEE International Symposium on High Performance Distributed Computing, Aug. 1996, 10 pages.

Lorie, Raymond, A, Physical Integrity in a large segmented database, ACM Trans. Database Systems, 2(1): 91-104, Mar. 1977.

Lorie, RA, Shadow Page Mechanism, IBM Technical Disclosure Bulletin, Jun. 1986, pp. 340-342.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Miller, Ethan L., et al., RAMA: A File System for Massively Parallel Computers, 12.sup.th IEEE Symposium on Mass Storage Systems, Monterey CA, Apr. 1993, pp. 163-168.

Morris, James H., et al., Andrew: A Distributed Personal Computing Environment, Comm. of the ACM, vol. 29, Mar. 1986, pp. 184-201.

Nelson, Michael et al., "Caching in the Sprite Network File System", ACM, Nov. 1987, pp. 3-4.

Network Appliance, Inc., Notification of Transmittal of the International Search Report and the Written Opinion of the International Searching Authority, or the Declaration, International Application No. PCT/US2005/030889, International Filing Date Aug. 31, 2005, Date of Mailing Jan. 13, 2006, 14 pages.

Network Appliance, Inc., Notification of Transmittal of the International Search Report and the Written Opinion of the International Searching Authority, or the Declaration, International Application No. PCT/US2005/031220, International Filing Date Sep. 1, 2005, Date of Mailing Oct. 18, 2006, 12 pages.
Ousterhout, John K. et al., The Sprite Network Operating System, Computer Science Division, Department of Electrical Engineering and Computer Sciences, Univ. of CA, Berkley, Nov. 19, 1987, 32 pages.
Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.
Performance Without Compromise: The Virtual Storage Architecture 1997, 11 pages.
Quinlan, Sean, A Cached WORM File System, Software-Practice and Experience, 21(12):1289-1299 (1991).
Rosenberg, J., et al., Stability in a Persistant Store Based on a Large Virtual Memory, in Security and Persistence, Rosenber, J. & Keedy, J.L. (ed), Springer-Verlag (1990) pp. 229-245.
Rosenblum, Mendel, et al. The Design and Implementation of a Log-Structured File System Jul. 24, 1991 pp. 1-15.
Rosenblum, Mendel, The Design and Implementation of a Log-Structured File System, 1992, pp. 1-93.
Rosenblum, Mendel, et al., The Design and Implementation of a Log-Structured File System, In Proceedings of ACM Transactions on Computer Systems, (10)1:26-52, Feb. 1992.
Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.
Ross, R. B. et al., "Using the Parallel Virtual File System", Jul. 2002, 31 pages.
Sandberg, Russel et al., Design and implementation of the Sun Network Filesystem. In Proc. Summer 1985 USENIX Conf., pp. 119-130, Portland OR (USA), Jun. 1985.
Santry, Douglas S., et al., Deciding When to Forget in the Elephant File System, Operating Systems Review, 34(5), (Dec. 1999) pp. 110-123.
Satyanarayanan, M., et al., The ITC Distributed File System: Principles and Design, In Proceedings of the 10th ACM Symposium on Operating Systems Principles, (19)5:56-67, Dec. 1985.
Satyanarayanan, M., A survey of distributed file-systems. Annual Review of Computing Science, 4(73-104), 1989.
Satyanarayanan, M., et al., Coda: A highly available file system for a distributed workstation environment Carnegie Mellon University, CMU-ITC.
Satyanarayanan, M., et al., Coda: A highly available file system for a distributed workstation environment. IEEE Transactions on Computers, 39(4):447-459, 1990.
Satyanarayanan, M., Scalable, Secure, and Highly Available Distributed File Access, Computer May 1990: 9-21.
Seltzer, Margo I., et al., Journaling Versus Soft Updates: Asynchronous Meta-Data Protection in File Systems, Proceedings of 200 USENIX Annual Technical Conference, Jun. 18-23, 2000.
Shinkai, E., et al.: "HAMFS File System" Reliable distributed systems, 1999. Proceedings of the 18th IEEE Symposium on Lausanne, Switzerland Oct. 19-22, 1999, Los Alamitos, CA, USA, IEEE Comput. Soc., US, Oct. 19, 1999, pp. 190-201, XP010356993.
Sidebotham, Bob, Volumes: The Andrew File System Data Structuring Primitive, EEUG Conference Proceedings, Manchester, UK, Autumn 1986.
Simitci, H., et al.: "Adaptive disk striping for Parallel Input/output" Mass Storage Systems, 1999. 16th IEEE Symposium on San Diego, CA, USA, Mar. 15-18, 1999, Piscataway, NJ, USA, IEEE, US, Mar. 15, 1999, pp. 88-102, XP010376289.
Subramanian, Muralidhar, et al., Performance Challenges in Object-Relational DBMSs, Data Engineering Journal 22, Feb. 1999 pp. 28-32.
Welch, Brent B., et al., Pseudo Devices: User-Level Extensions to the Sprite File System, Computer Science Division, Department of Electrical Engineering and Computer Sciences, Univ. of CA, Berkley, Apr. 1988, 13 pages.
Welch, Brent B., et al., Pseudo-File-Systems, Computer Science Division, Department of Electrical Engineering and Computer Sciences. Univ. of CA, Berkley, Oct. 1989, 22 pages.
West, Michael, et al. The ITC Distributed File System: Prototype and Experience, Carnegie-Mellon University, Technical Report CMU-ITC-040, Mar. 1985, 17 pages.
Common Internet File System (CIFS) Version: CIFS-Spec 1.0, Storage Networking Industry Association (SNIA), SNIA CIFS Documentation Work Group, Revision Date: Mar. 1, 2002.
Shepler et al., (Apr. 2003) Internet Engineering Task Force (IETF) Request for Comments (RFC) 3530, Network File System (NFS) version 4 Protocol.
Callaghan et al., (Jun. 1995) Internet Engineering Task Force (IETF) Request for Comments (RFC) 1813, Network File System (NFS) version 3 Protocol.

\* cited by examiner

SYSTEM AND METHOD FOR ADDRESSING DATA CONTAINERS USING DATA SET IDENTIFIERS

FIELD OF THE INVENTION

The present invention relates to clustered storage systems and, more particularly, to addressing volumes, such as data containers, in a clustered storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on disks as a hierarchical structure of data containers, such as volumes, files, and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a clustered storage system configured to service many clients. Each storage system may be configured to service one or more data containers, such as volumes, wherein each volume stores one or more, e.g., files. Yet often a large number of data access requests issued by the clients may be directed to a small number of data containers serviced by a particular storage system of the cluster. A solution to such a problem is to distribute the volumes serviced by the particular storage system among all of the storage systems of the cluster. This, in turn, distributes the data access requests, along with the processing resources needed to service such requests, among all of the storage systems, thereby reducing the individual processing load on each storage system. However, a noted disadvantage arises when only a single file is heavily accessed by clients of the clustered storage system. As a result, the storage system attempting to service the requests directed to that file may exceed its processing resources and become overburdened, with a concomitant degradation of speed and performance.

One noted disadvantage of utilizing clustered storage systems is that a plurality of instantiations of volumes may be distributed across the systems of the cluster. These volumes may include, e.g., persistent consistency point images (PCPIs) of the volume, mirrored volumes, etc. In a conventional clustered storage system, many of the volumes within the cluster may represent the same data set, and, thus, store identical data; an example of such volumes is a mirrored volume arrangement having a source volume and one or more "mirror" destination volumes. To improve data availability, it may be desirable to service a data access request from any of the volumes within the cluster that share identical data. However, many data access protocols, such as the Network File System protocol (NFS), may not function properly should an identifier (ID) of the volume differ between the request and the volume servicing the request. For example, an NFS request directed to a source volume having a volume ID of 1000 will return an error message if it is served from a destination volume having an ID of 1001, even if the destination volume is a mirror of the source volume.

SUMMARY OF THE INVENTION

The present invention overcomes the disadvantages of the prior art by providing a system and method for addressing data containers in a clustered storage system. In accordance with the illustrative embodiment, each data container such as a volume, is associated with a data set identifier (DSID) and each instantiation of the data container that represents a single point in time image of the container's data set is associated with a DSID. Furthermore, the entire collection of the data container and its instantiations is associated with a master data set identifier (MSID). Thus, a single MSID may be associated with a plurality of DSIDs within the clustered storage system. A volume location database (VLDB) utilizes a replicated database among the storage systems of the cluster, to maintain a data set data structure containing appropriate mapping information between the MSIDs and DSIDs. DSIDs may be created and/or destroyed by modifying the number of instantiations of the data container by, e.g., establishing a new mirroring relationship, breaking a mirror, creating a persistent consistency point image (PCPI) of data, etc.

Clients of the clustered storage system utilize MSIDs to access data of the data containers. When receiving a data access request containing a MSID, a storage system accesses the VLDB to identify an appropriate DSID to which to forward the request. Upon identifying the appropriate DSID to forward the request, the storage server may utilize mapping tables within the VLDB to identify which storage system within the duster is currently servicing the identified DSID. The data access request is then forwarded to the appropriate storage system for processing.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
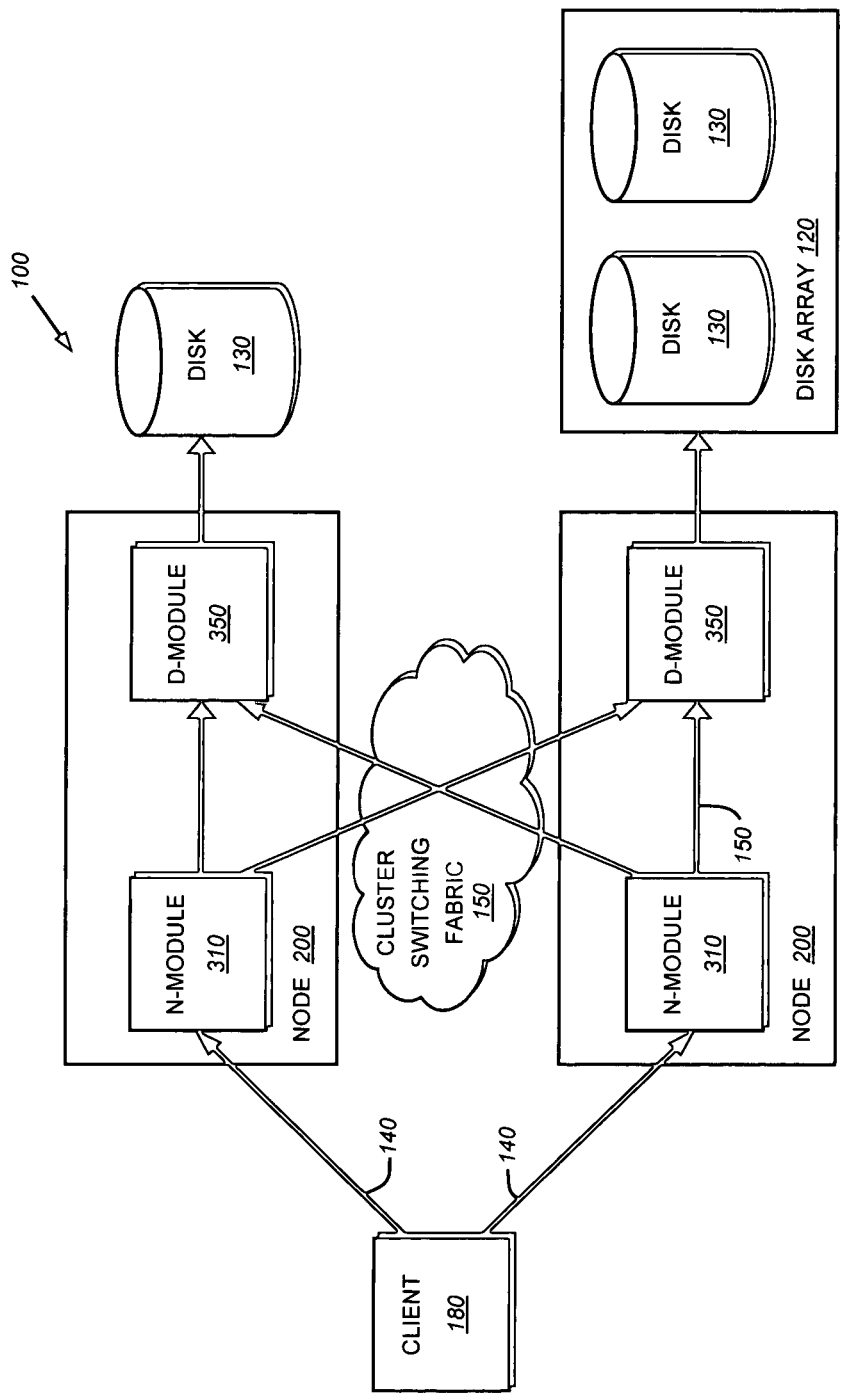
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. Exemplary distributed file system architecture is generally described in U.S. Pat. No. 6,671,773, titled METHOD AND SYSTEM FOR RESPONDING TO FILE SYSTEM REQUESTS, by Michael Kazar et al. issued Dec. 30, 2003.

It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
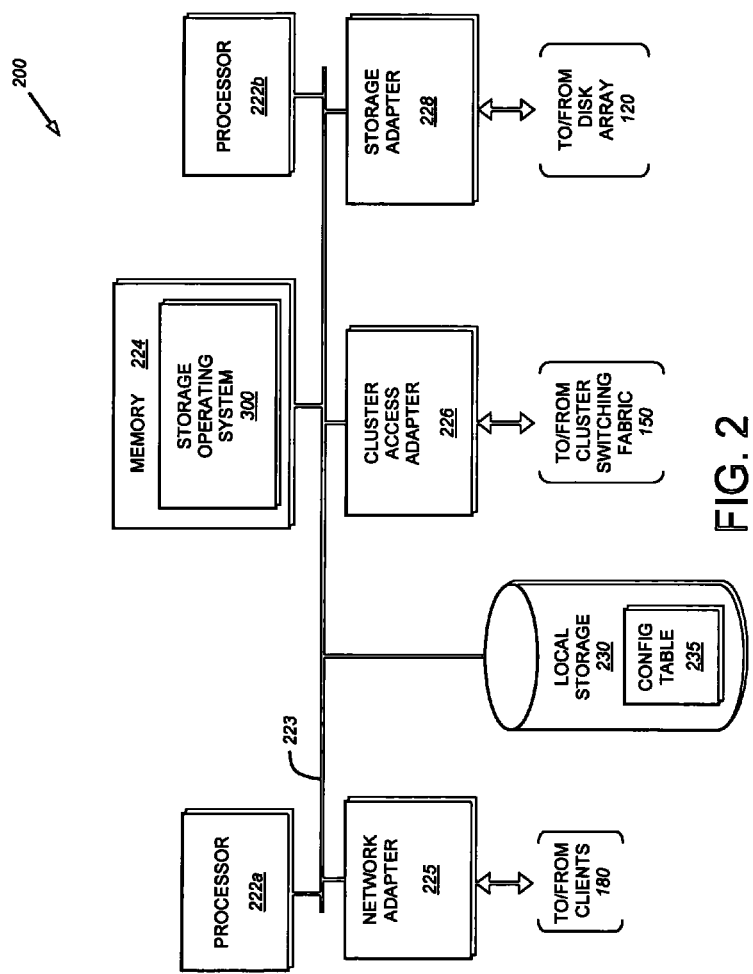
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as volumes, directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter 228 comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 3:
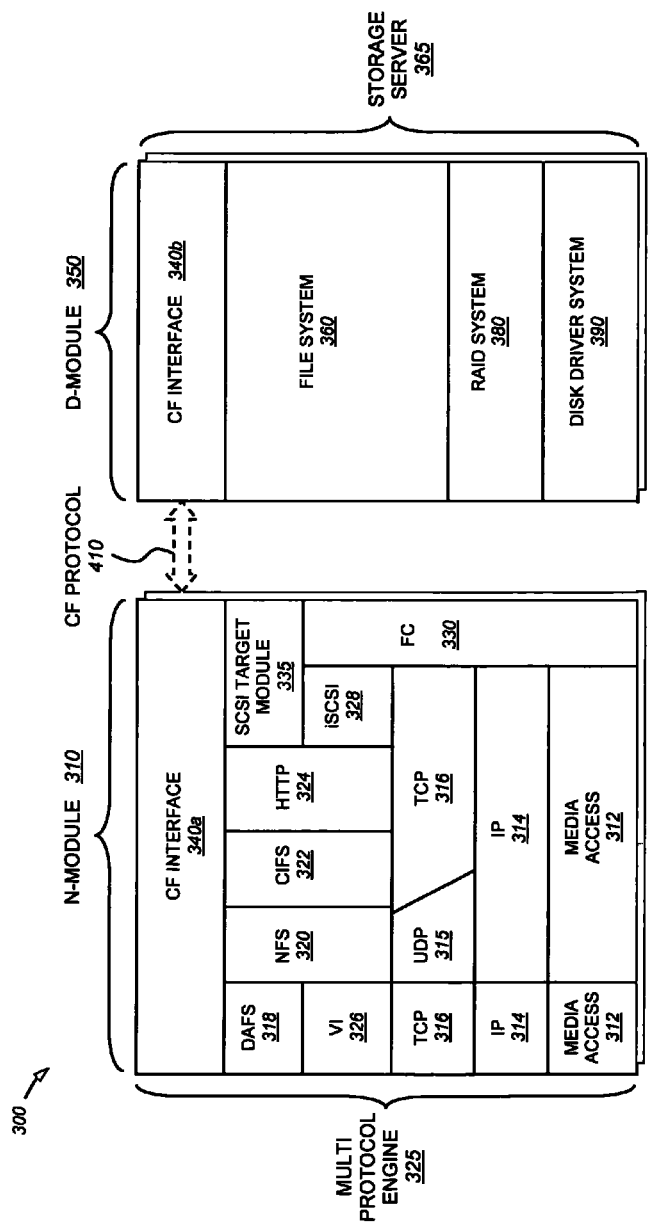
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In accordance with the illustrative embodiment, various protocol layers, such as the NFS layer 320, and CIFS layer 322, utilize a volume location database (VLDB), described further below in reference to FIG. 11, to map an appropriate master data set identifier (MSID) contained within a data access request to a data set identifier (DSID) for use in processing the data access request. Clients of the cluster utilize MSIDs to signify to which data containers their data access requests are directed. The protocol layers interface with the VLDB, described further below, to map the MSID to a DSID, which is then utilized to identify an appropriate D-module to which the data access request is forwarded.

In addition, the storage operating system 300 includes a series of software layers organized to form a storage server 365 that provides data paths for accessing information stored on the disks 130 of the node 200. To that end, the storage server 365 includes a file system module 360, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. It should be noted that in certain embodiments of the present invention, the clustered storage system may implement known striped volume sets. Striped volume sets are further described in U.S. patent application Ser. No. 11/119,278, and titled STORAGE SYSTEM ARCHITECTURE FOR STRIPING DATA CONTAINER CONTENT ACROSS VOLUMES OF A CLUSTER, by Michael Kazar et al., now U.S. Pat. No. 7,698,289 issued Apr. 13, 2010, the contents of which are hereby incorporated by reference.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system 360 uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. In accordance with the illustrative embodiment, the client utilizes a MSID to identify the data container to which the data access request is directed. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide highly-scalable, distributed storage system architecture of the cluster 100. To that end, each module includes a cluster fabric (CF) interface module 340a,b adapted to implement intra-cluster communication among the modules, including D-module-to-D-module communication.

The protocol layers, e.g., the NFS/CIFS layers and the iSCSUFC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773, by Michael Kazar et al., issued Dec. 30, 2003.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

Figure 4:
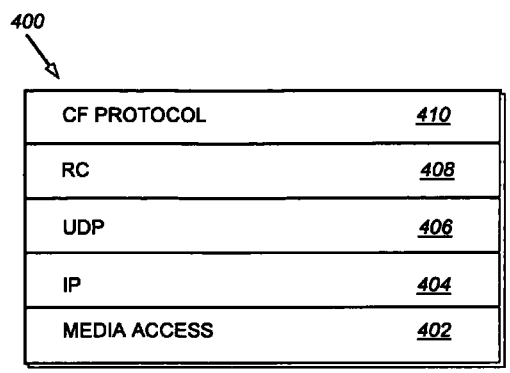
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
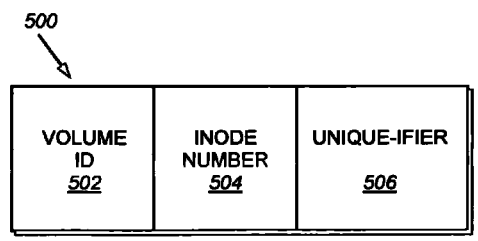
FIG. 5 is a schematic block diagram illustrating the format of a file handle in accordance with an embodiment of the present invention.

A data container, such as a file, is accessed in the file system using a file handle. FIG. 5 is a schematic block diagram illustrating the format of a file handle 500 including a data container (e.g. volume) ID field 502, an inode number field 504 and, a unique-ifier field 506. The volume ID field 502 contains a global identifier (within the cluster 100) of the volume within which the file resides. Illustratively, the volume ID comprises a MSID identifying a particular point in time representation of the data that is desired to be accessed. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields.

E. File System Organization

Figure 6:
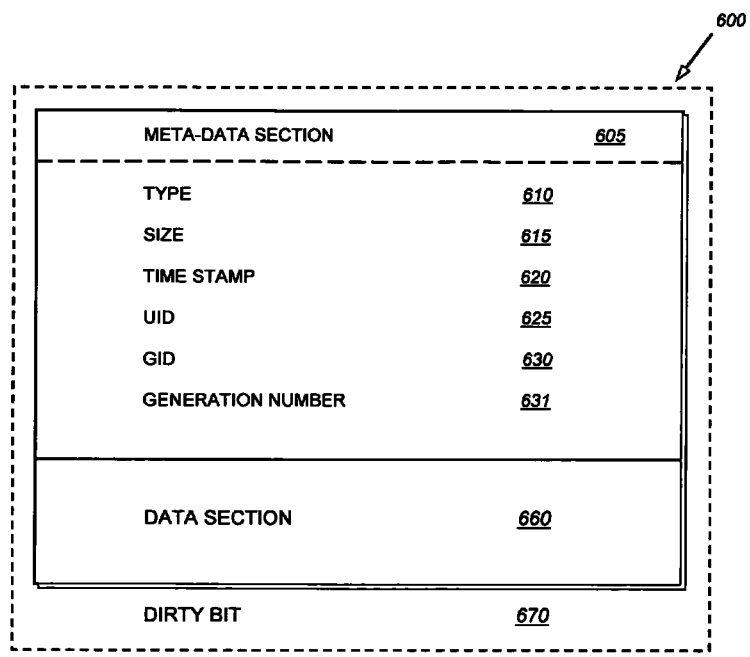
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The meta-data section 605 also includes a generation number 631. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the Mode (e.g., a first level Mode) comprises up to 16 pointers, each of which references a 4 KB block of data on the disk.

Moreover, if the size of the data is greater than 64 KB but less than or equal to 64 megabytes (MB), then each pointer in the data section 660 of the Mode (e.g., a second level Mode) references an indirect block (e.g., a first level L1 block) that contains 1024 pointers, each of which references a 4 KB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, contains 1024 pointers, each of which references a 4 KB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
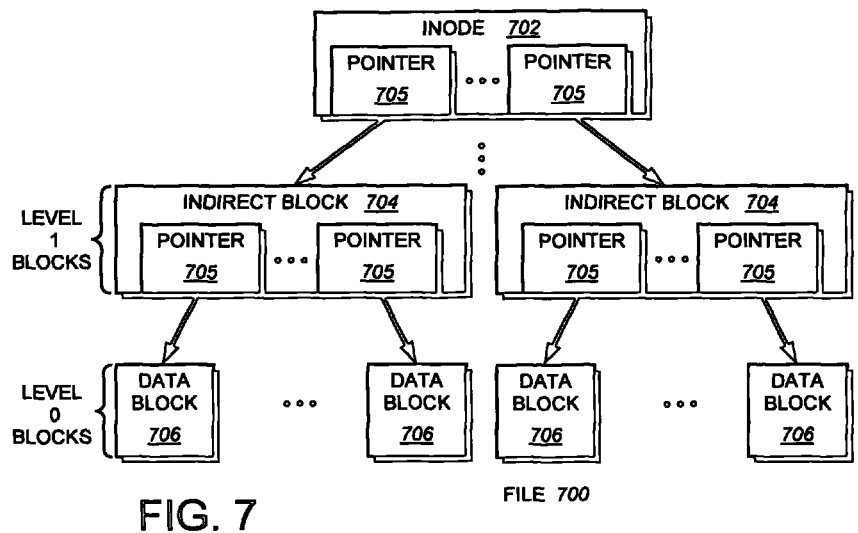
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al., now U.S. Pat. No. 7,409,494 issued Aug. 5, 2008 and assigned to Network Appliance, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
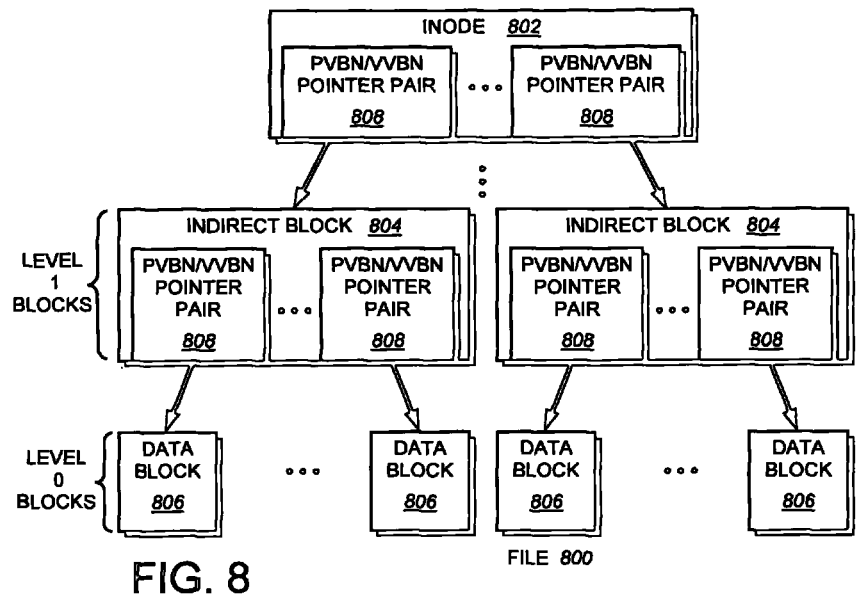
FIG. 8 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
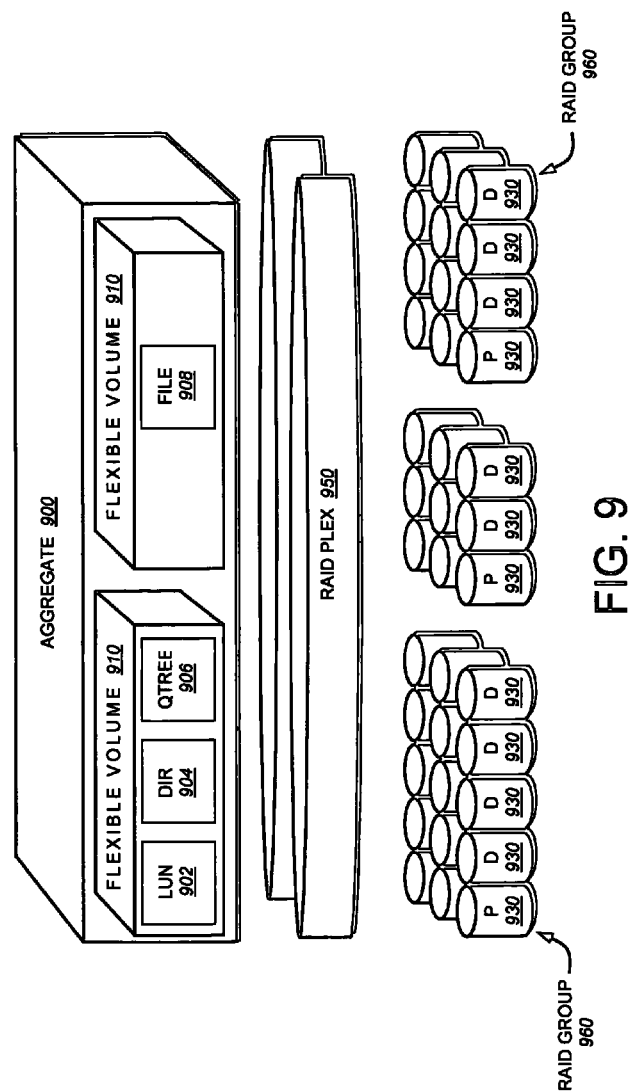
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
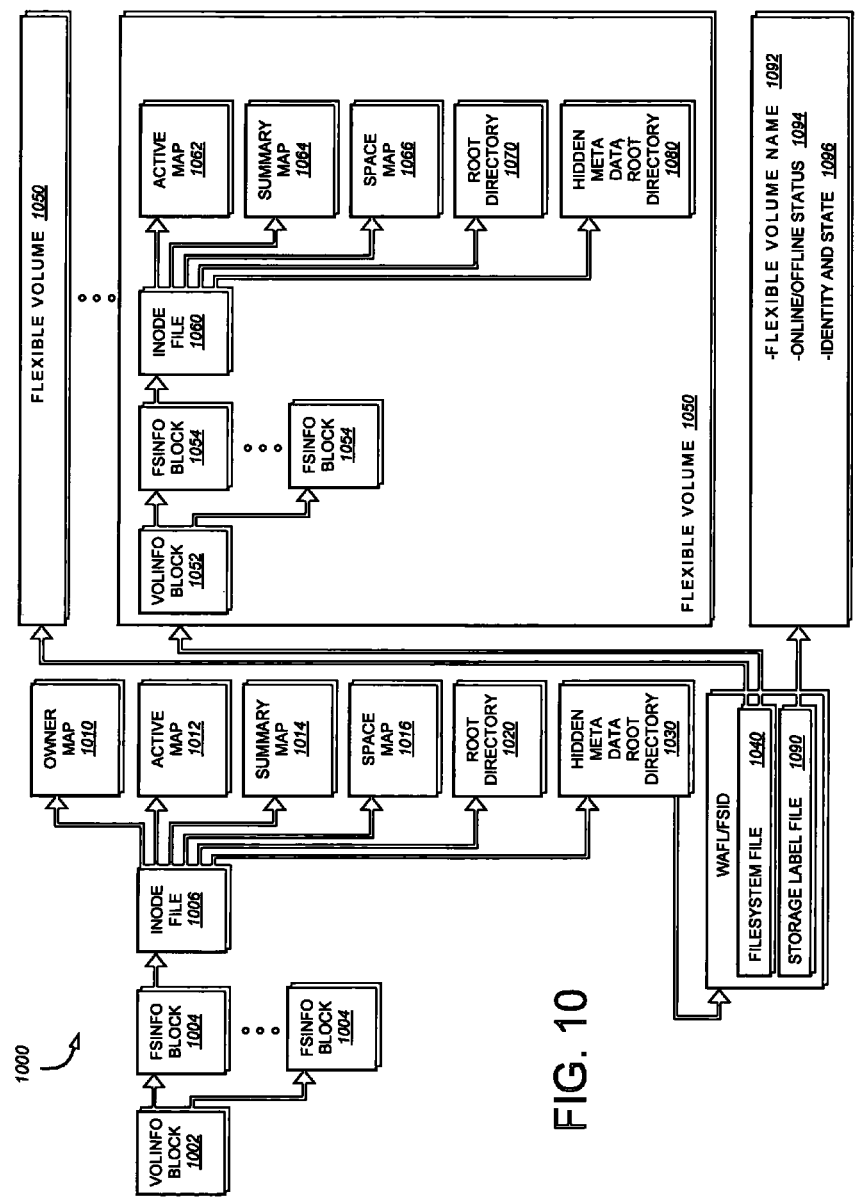
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct Mode space with corresponding Mode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. VLDB

Figure 11:
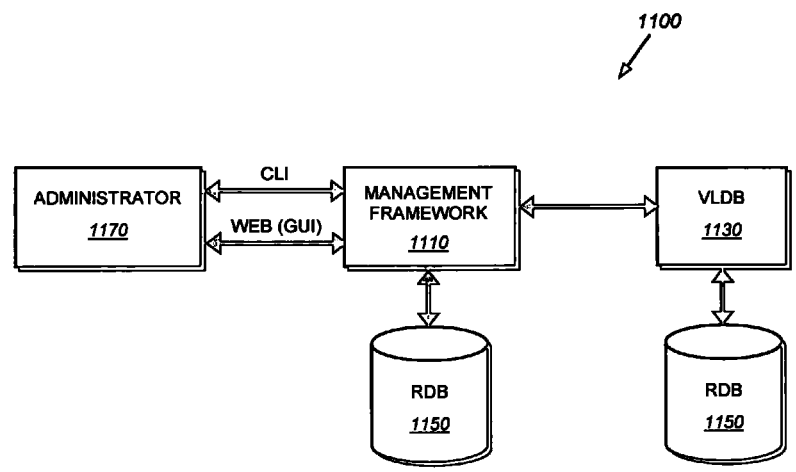
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110 and a volume location database (VLDB) process 1130, each utilizing a data replication service (RDB 1150) linked as a library. The management framework 1110 provides an administrator 1170 an interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 1130 is a database process that tracks the locations of various storage components, including data containers such as flexible volumes, (hereafter "volumes") within the cluster 100 to thereby facilitate routing of requests throughout the cluster. As noted, many volumes, such as mirrored volumes ("mirrors"), share identical data and, as such, it may be advantageous to source a data access request from any of such volumes in the cluster. However, certain data access protocols, such as NFS, do not support changes to a data container ID within the file handle. Thus, if it is desirable to service data from a mirror, an error condition may result. Yet, as further noted, in accordance with the illustrative embodiment, clients 180 utilize MSIDs as data container IDs for all data access protocol requests. The MSID is mapped to an appropriate (DSID) within the cluster for use in servicing the data access request. When a response is returned to the client, the cluster utilizes the same MSID as utilized in the original request, regardless of the DSID used to service the data access request. In this way, the use of a plurality of the instantiations of data sets is made transparent to clients of the clustered storage system.

Accordingly, the present invention provides a system and method for addressing data containers in a clustered storage system. In the illustrative embodiment, each data container, such as a volume, is associated with a DSID and each instantiation of the data container that represents a single point in time image of the container's data set is associated with a DSID. Furthermore, the entire collection of the data container and its instantiations is associated with a master data set identifier (MSID). Thus, a single MSID may be associated with a plurality of DSIDs within the clustered storage system. A VLDB utilizes a replicated database among the nodes of the cluster to maintain a data set data structure containing appropriate mapping information between the MSIDs and DSIDs. DSIDs may be created and/or destroyed by, e.g., establishing a mirror, breaking a mirror, creating a PCPI of data, etc.

Clients of the clustered storage system utilize MSIDs to access data of the data containers. When receiving a data access request containing a MSID, a storage system accesses the VLDB to identify an appropriate DSID to which to forward the request. Upon identifying the appropriate DSID, the storage system accesses the data set data structure maintained by the VLDB to identify which storage system within the cluster is currently servicing the identified DSID. The data access request is then forwarded to that storage system for processing.

Further to the illustrative embodiment, the VLDB contains one or more data set data structures 1200 that associate a single MSID with one or more DSIDs representative of various instantiations of the data within the cluster. Thus, N/D-modules may utilize the VLDB to identify those instantiations of data that are associated with a single MSID, e.g., identifying a mirror destination volume as containing identical data as that contained in the source volume.

Figure 12:
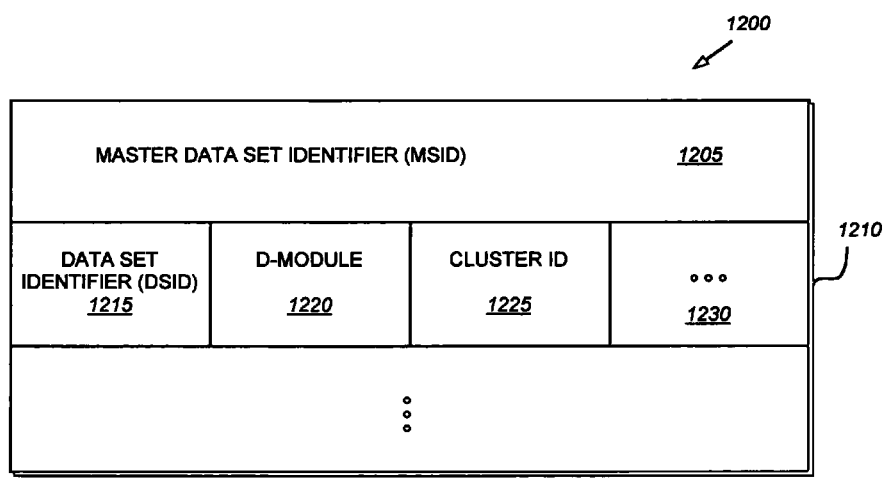
FIG. 12 is a schematic block diagram of a data set data structure stored within a volume location database in accordance with an embodiment of the present invention.

FIG. 12 is a schematic block diagram of an exemplary data set identifier data structure 1200 in accordance with an embodiment of the present invention. Each the data set data structure 1200 includes a MSID field 1205 and one or more entries 1210. Each entry 1210 comprises a DSID field 1215, a D-module field 1220, a cluster identifier field 225 and, in alternate embodiments, additional fields 1230. The MSID field 1205 contains a MSID value associated with the data set data structure 1200, i.e., each entry 1210 is associated with one DSID that is related to the MSID identified in the MSID field 1205. The DSID field 125 contains a data set identifier value for the particular instantiation of the data associated with the MSID 1205. The D-module field 1220 identifies a D-module within the storage system cluster that is currently servicing the DSID. Similarly, the cluster ID field 1225 identifies the cluster within which the D-module identified in field 1220 exists. In the illustrative embodiment, the cluster ID field 1225 may identify the local cluster or, in alternate embodiments, may identify a remote cluster. For example, a data container may be mirrored to another cluster. In such an embodiment, the mirror destination entry 1210 would identify the cluster ID associated with the cluster servicing the mirror destination data container.

Figure 13:
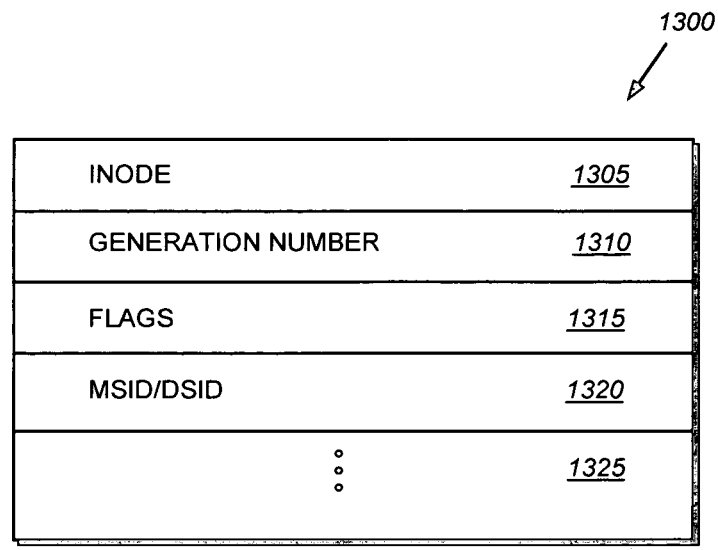
FIG. 13 is a schematic block diagram of an exemplary data container handle utilized in accordance with an embodiment of the present invention.

FIG. 13 is a schematic block diagram of an exemplary in-core data container handle 1300 utilized by the storage operating system in accordance with an embodiment of the present invention. The data container handle 1300 includes a plurality fields including an inode field 1305, a generation number field 1310, a flags field 1315, the MSID/DSID field 1320 and, in alternate embodiments, additional fields 1325. The inode field 1305 contains an inode number identifying the inode associated with the data container referred to by the data container handle 1300. The generation number field 1310 contains a generation number of the Mode to differentiate among reused Mode numbers, such as that described above in reference to FIG. 6. The flags field 1320 is utilized by the storage operating system to store various state information related to the data container, including, e.g., lock state information. The MSID/DSID field 1320 stores the appropriate MSID and/or DSID associated with the data container to enable the storage operating system to perform mapping operations between client requests (utilizing MSIDs) and internal operations, which may utilize DSIDs to differentiate among instantiations of data.

Figure 14:
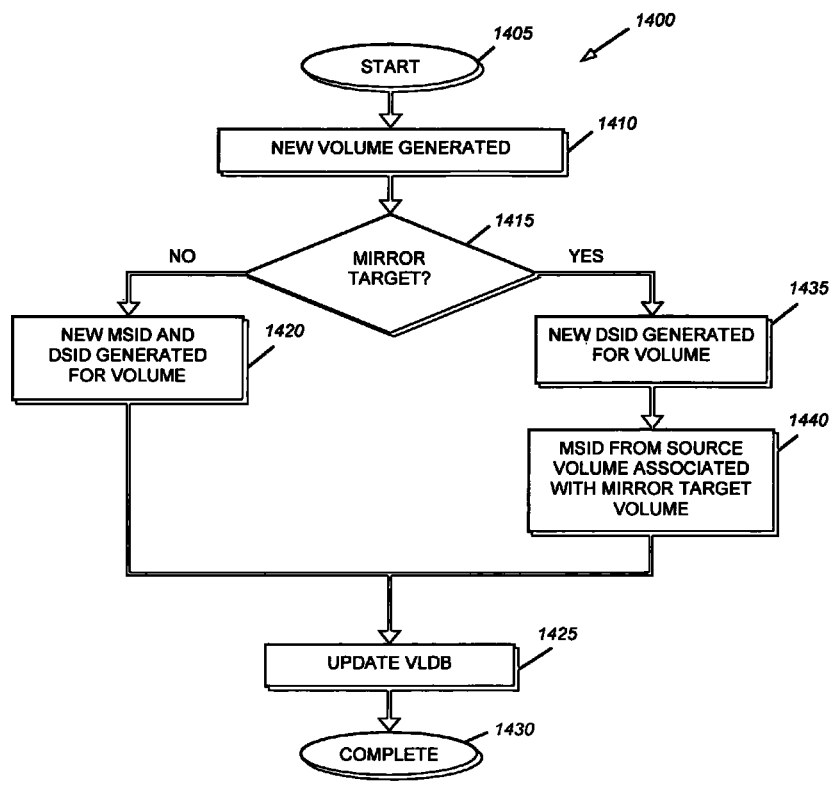
FIG. 14 is a flowchart detailing the steps of a procedure for generating a volume and associated master data set identifier and/or data set identifier in accordance with an embodiment of the present invention.

FIG. 14 is a flowchart illustrating the steps of a procedure 1400 for generating a volume (or other data container) in accordance with an embodiment of the present invention. Procedure 1400 begins in step 1405 and continues to step 1410 where the new volume is generated using, e.g., a conventional file system volume generation technique. Such volume generation may be automatically initiated by the storage operating system or may be the result of an administrator entering certain commands into a user interface such as a CLI or GUI. Once the volume is generated, a determination is made whether the newly generated volume is a mirror target, i.e., if the new volume is arranged in a cooperative relationship with a source volume so that the source volume is mirrored to the newly generated destination volume, in step 1415. If the newly generated destination volume is not a mirror target, then the procedure branches to step 1420 where new MSID and DSID values are generated for the volume. The MSID and DSID values are illustratively 32 bit values that are unique within the cluster. However, in alternate embodiments, differing lengths may be utilized. As such, the description of MSID and DSID values being 32 bits should be taken as exemplary only. The storage operating system updates the VLDB by adding a new data set data structure 1200 to the VLDB with the appropriate mapping between the newly generated MSID and DSID in step 1425 before the procedure 1400 completes in step 1430.

However, if in step 1415, it is determined that the newly-generated destination volume is a mirror target, the procedure 1400 branches to step 1435 where a new DSID is generated for the volume. As noted above, the new DSID value is illustratively a 32 bit value that is unique within the cluster. Then, in step 1440, the MSID from the source volume, i.e., the volume that is being mirrored to the mirror target volume, is associated with the mirror target volume. Once the DSID and MSID are determined steps 1435 and 1440, the storage operating system then updates the VLDB in step 1425 before the procedure completes in step 1430. Such updating of the VLDB includes, e.g., modifying the appropriate data set data structure 1200 to indicate the newly added DSID entry.

Figure 15:
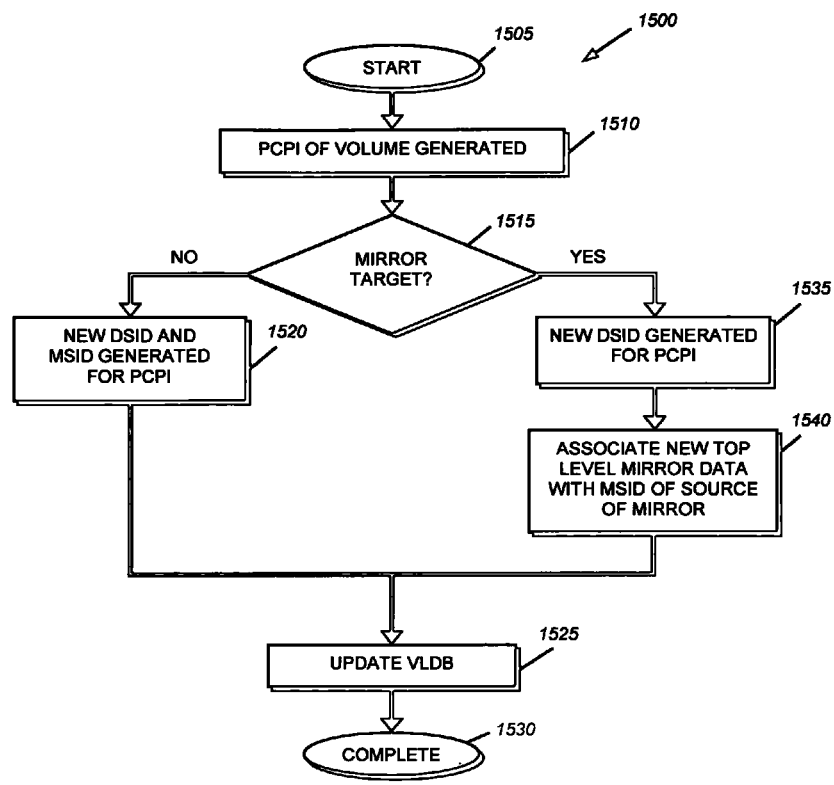
FIG. 15 is a flowchart detailing the steps of a procedure for generating a persistent consistency point image of a volume in accordance with an embodiment of the present invention.

FIG. 15 is a flowchart detailing the steps of a procedure 1500 for generating a PCPI of a volume in accordance with an embodiment of the present invention. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as a volume/active file system, file or database, stored on a storage device (e.g., on disk) or other persistent memory and having a name or other identifier that distinguishes it from other PCPIs taken at other points in time. A PCPI can also include other information (metadata) about the active file system (volume) at the particular point in time for which the image is taken.

The procedure 1500 begins in step 1505 and continues to step 1510 where a PCPI of the volume is generated using, e.g., conventional PCPI generation techniques, such as that described in the above-referenced U.S. Pat. No. 5,819,292. A determination is made in step 1515 whether the volume is a mirror target. If the volume is not a mirror target, the procedure branches to step 1520 where new DSID and MSID values are generated for the PCPI. The VLDB is then updated in step 1525 using the generated MSID and DSID values before procedure 1500 completes in step 1530. However, if in step 1515, it is determined that the PCPI is a mirror target, then the procedure branches to step 1535 where a new DSID is generated for the PCPI. Then, in step 1540, new "top level" mirror data is associated with the MSID of the source mirror. That is, for example, the volume serving as the mirror target (or destination volume) is associated with the same MSID as the mirror source (or source volume) as both represent the data container at a particular point in time. The VLDB is updated in step 1525 before the procedure 1500 completes in step 1530.

Figure 16:
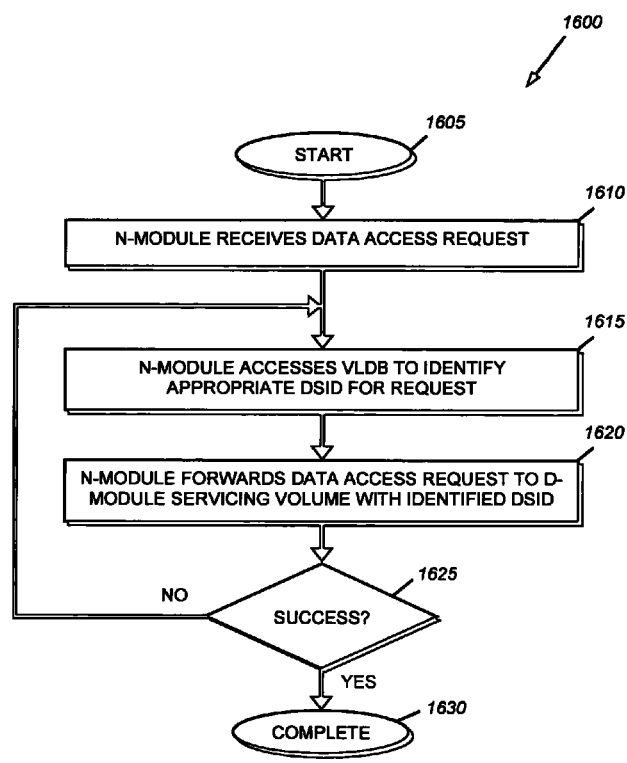
FIG. 16 is a flowchart detailing the steps of a procedure for processing data access request in accordance with an embodiment of the present invention.

FIG. 16 is a flowchart of the procedure 1600 for processing data access requests in accordance with an embodiment of the present invention. The procedure 1600 begins in step 1605 and continues to step 1610 where an N-module of the cluster receives a data access request. Illustratively, the data access request is directed to a particular MSID value, i.e., the data container handle utilizes a MSID value to identify the data container to which the request is directed. In step 1615, the N-module accesses the VLDB to identify the appropriate DSID for processing the request by, e.g., performing the appropriate mapping between the MSID and one or more DSIDs. The N-module forwards the data access request to the D-module servicing the volume having the identified DSID in step 1620. A determination is made whether the operation was successful in step 1625. If so, the procedure then completes in step 1630. However if the operation is not successful then, in step 1625, the procedure branches back to step 1615 and the N-module identifies another DSID associated with the MSID to be utilized in servicing the request. Thus, if multiple instantiations of the same data exists within the clustered storage system, the N-module may be able to redirect the data access request to one of the plurality of instantiations by identifying alternate DSIDs associated with the MSID to service the request.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for processing a plurality of data access requests addressing a data container in a clustered storage system, the clustered storage system including a plurality of nodes configured to receive the plurality of data access requests, the method comprising:
    associating a first data set identifier with the data container, the data container generated and stored on a first node of the clustered storage system;
    creating a master data set identifier at the first node of the clustered storage system;
    associating a second data set identifier with an instantiation of the data container that represents a single point in time image of the data container, wherein the first data set identifier is different than the second data set identifier, wherein the instantiation of the data container is stored on a second node of the clustered storage system, and wherein the first data container and second data container have distinct inode address spaces;
    associating the master data set identifier with the first data set identifier and the second data set identifier;
    receiving, at a third node of the clustered storage system, a first data access request of the plurality of data access requests directed to the master data set identifier using a network protocol;
    forwarding the first data access request to the first node to service the first data access request from the data container, wherein the forwarded first data access request includes an inode number;
    replying to the first data access request upon service completion of the first data access request, wherein the reply to the first data access request includes the master data set identifier;
    receiving, at the third node of the clustered storage system, a second data access request of the plurality of data access requests directed to the master data set identifier using the network protocol;
    forwarding the second data access request to the second node to service the second data access request from the instantiation of the data container, wherein the forwarded second data access request includes the inode number and the master data set identifier; and
    replying to the second data access request upon service completion of the second data access request, wherein the reply to the second data access request includes the master data set identifier.

2. The method of claim 1 wherein each data access request comprises a file handle, and wherein the generated value of the master data set identifier is at least 32 bits in length.

3. The method of claim 1 wherein the instantiation of the data container is associated with a name, and wherein the first and second data set identifiers are numeric values.

4. The method of claim 1 further comprising:
    identifying the first node as storing the data container using a database that includes a plurality of entries, wherein an entry associates the first data set identifier with the master data set identifier and with the first node.

5. The method of claim 4 further comprising identifying the clustered storage system associated with the first data set identifier within the entry of the plurality of entries of the database.

6. The method of claim 1 further comprising:
    in response to a failure of the first data access request, identifying the second data set identifier associated with the master data set identifier; and forwarding the first data access request to the second node to service the first data access request from the instantiation of the data container.

7. The method of claim 1 wherein the instantiation of the data container is a mirror of the data container.

8. The method of claim 1 wherein the network protocol is a Network File System protocol.

9. The method of claim 1 wherein the first data access request comprises a first file handle and the second data access request comprises a second file handle, and wherein the first and second file handles include the master data set identifier.

10. The method of claim 1, wherein the first data set identifier identifies a first file system and the second data set identifier identifies a second file system.

11. The method of claim 1, wherein the master data set identifier identifies a source volume.

12. The method of claim 1, wherein the first identifier identifies a volume and the second identifier identifies a second volume.

13. A system configured to address a data container in a clustered storage system, the system comprising:
    means for associating a first data set identifier with the data container and a different data set identifier with each instantiation of the data container that represents a single point in time image of the data container;
    means for associating a master data set identifier with the first data set identifier and the different data set identifier associated with each instantiation of the data container, wherein the master data set identifier is a created value within the clustered storage system, wherein each data set identifier is a generated value having a same bit-length as the master data set identifier, and wherein each instantiation of the data container has a distinct inode address space;
    means for receiving at a network element on a storage system of the clustered storage system, a data access request directed to the master data set identifier using a Network File System protocol;
    means for identifying at the network element one of the data set identifiers associated with the master data set identifier, by reading an associated data set identifier data structure that includes a master data set identifier field and one or more data set identifier fields to enable mapping between the master data set identifier and the one or more data set identifiers to forward the data access request thereto,
    means for mapping the master data set identifier to one of the data set identifiers;
    means for identifying one of the data set identifiers to satisfy the data access request; and
    means for forwarding, from the storage system that received the data access request, the identified data set identifier associated with the master data set identifier, wherein the means for forwarding includes an inode number and the master data set identifier;
    means for replying to the data access request, wherein the reply to the data access request includes the master data set identifier.

14. A system configured to receive a data access request addressing one or more data containers in a storage system cluster, the clustered storage system including a plurality of nodes configured to receive the data access request, the system comprising:
    a plurality of disk elements serviced by the storage system cluster, each data container having one or more instantiations served by one or more differing disk elements of the cluster;
    a volume location database storing a data set identifier data structure associating a master data set identifier created within the clustered storage system with one or more data set identifiers, each of the data set identifiers associated with a different instantiation of same data stored in the one or more data containers, wherein each of the one or more data containers has a distinct inode address space; and
    a network element of the cluster configured to receive a data access request having a data container handle containing the master data set identifier, wherein the network element is further configured to access the volume location database to identify one of the data set identifiers associated with the master data set identifier and forward the data access request to one of the disk elements serving the different instantiation associated with the identified data set identifier, wherein the master data set identifier is a generated value, wherein each data set identifier is a generated value having a same bit-length as the master data set identifier, wherein the forwarded data access request includes an inode number and the master data set identifier, and wherein the reply to the data access request includes the master data set identifier.

15. The system of claim 14 wherein the network element is further configured to, in response to an error condition, identify a another data set identifier associated with the master data set identifier.

16. The system of claim 15 wherein the network element is further configured to forward the data access request to one of the disk elements serving the different instantiation associated with the another data set identifier.

17. The system of claim 14 wherein the data set identifier data structure comprises one or more entries associated with the one or more instantiations of the data container.

18. The system of claim 14 wherein the data set identifier data structure identifies which of the disk elements to serve each of the one or more instantiations of the data container.

19. The system of claim 14 wherein one of the one or more instantiations of the data container comprises a persistent consistency point image.

20. The system of claim 14 wherein one of the one or more instantiations of the data container comprises a minor.

21. The method of claim 14 wherein the data access is a Network File System protocol read request.

* * * * *

UNITED STATES PATENT AND TRADEMARK OFFICE
CERTIFICATE OF CORRECTION

PATENT NO. : 8,489,811 B1
APPLICATION NO. : 11/648161
DATED : July 16, 2013
INVENTOR(S) : Peter F. Corbett et al.

It is certified that error appears in the above-identified patent and that said Letters Patent is hereby corrected as shown below:

In the Specification:

In col. 3, line 8 should read:
within the ~~duster~~cluster is currently servicing the identified DSID.

In col. 3, line 63 should read:
in accordance with an embodiment of the present invention somewhat;

In col. 7, line 48 should read:
~~minoring~~ mirroring and/or parity (RAID). The file system 360 illustra- In col. 9, line 24 should read:
~~iSCSUFC~~ iSCSI/FC layers, of the N-module 310 function as protocol In col. 11, line 11 should read:
KB, then the data section of the ~~Mode~~ inode (e.g., a first level ~~Mode~~inode)

In col. 11, line 16 should read:
the data section 660 of the ~~Mode~~ inode (e.g, a second level ~~Mode~~inode)

In col. 14, line 19 should read:
own indole file 1060 and distinct ~~Mode~~ inode space with corre- In col. 14, line 20 should read:
sponding ~~Mode~~inode numbers, as well as its own root (fsid) direc- In col. 16, line 4 should read:
1310 contains a generation number of the ~~Mode~~inode to differen- Signed and Sealed this
Fifth Day of November, 2013

Teresa Stanek Rea
*Deputy Director of the United States Patent and Trademark Office*